United States Patent Office 2,722,796
Patented Nov. 8, 1955

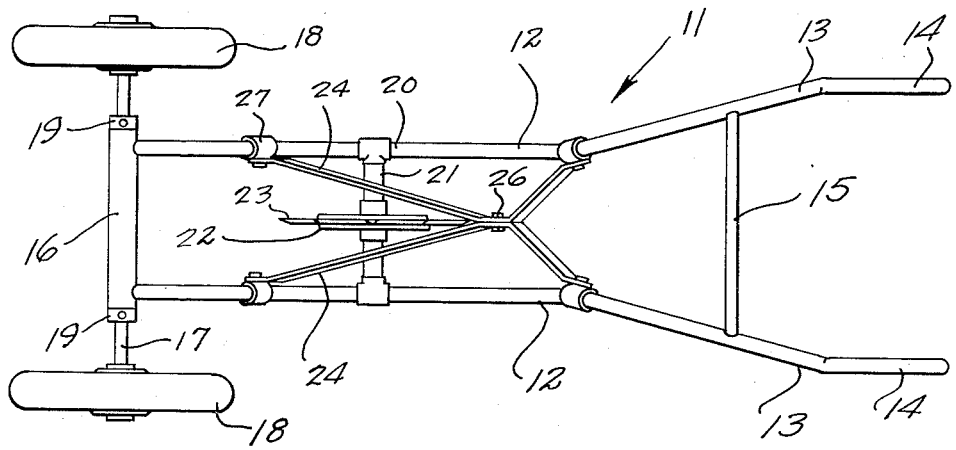
FIG. 1.
FIG. 2.
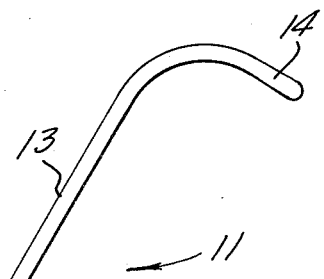
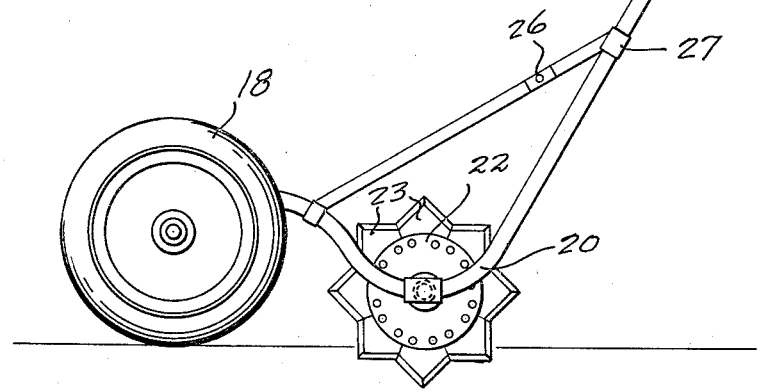
INVENTOR.
JULIUS E. ERICKSON,
BY
McMorrow, Berman + Davidson
ATTORNEYS.

2,722,796

LAWN EDGER

Julius E. Erickson, San Diego, Calif.

Application January 7, 1955, Serial No. 480,408

3 Claims. (Cl. 56—256)

This invention relates to gardening implements, and more particularly to an improved lawn edging tool.

A main object of the invention is to provide a novel and improved lawn edging tool which is simple in construction, which is easy to operate, and may be accurately guided to cut the edge of a lawn to provide a smooth and neat contour around the lawn.

A further object of the invention is to provide an improved lawn edging tool which is inexpensive to manufacture, which is sturdy in construction, which is light in weight, and which is relatively compact in size.

Further objects and advantages of the invention will become apparent from the following description and claims, and from the accompanying drawings, wherein:

Figure 1 is a top plan view of an improved lawn edging tool constructed in accordance with the present invention.

Figure 2 is a side elevational view of the lawn edging tool of Figure 1.

Referring to the drawings, the improved lawn edging tool is designated generally at 11 and comprises a frame consisting of a pair of handle bars 12, 12, said handle bars being parallel at their lower portions and diverging at their upper portions, as shown at 13, 13 in Figure 1, the handle bars terminating in the grip portions 14, 14. The divergent upper portions of the handle bars 12 are connected rigidly by a transverse bar 15, the lower forward ends of the handle bars being rigidly connected by a transverse sleeve member 16 in which is journaled the front axle 17. Mounted on the ends of the axle 17 are the respective ground-engaging supporting wheels 18, 18, the axle being retained in a centered position in the sleeve 16 by the provision of respective bearing collars 19, 19 on the axle adjacent the opposite ends of the sleeve member 16.

The handle bars are formed with the U-shaped portions 20, 20, the bight elements of said U-shaped portions being connected by a transverse axle member 21, on the intermediate portion of which is journaled a toothed cutting wheel 22.

As shown in Figure 2, the cutting wheel 22 is provided with relatively large, generally triangular cutting teeth 23, the apices of said teeth subtending angles of the order of 90°, whereby the cutting wheel 22 is generally star-shaped, as will be apparent from Figure 2.

The portions of the handle bars 12 on the opposite sides of the U-shaped elements 20 are respectively connected by brace bars 24, said brace bars being bent inwardly and being secured together at their intermediate portions by a transverse rivet 26. As shown the ends of the bars 24 are secured to sleeve members 27 rigidly fastened to the handle bars 12, 12. Thus, the brace bars 24, 24 serve to rigidify the lower portion of the framework carrying the cutting wheel 22, and also serve to rigidify the remainder of the framework of the edging tool.

In operation, the tool is moved along the edge of the lawn with the cutting wheel 22 engaged in said edge, as illustrated in Figure 2, the tool being otherwise supported on the front wheels 18, 18. The user may apply cutting force to the cutting wheel 22 by exerting downward force on the handle grip elements 14, 14, thus enabling the lawn to be accurately and neatly trimmed to provide the desired edge contour.

While a specific embodiment of an improved lawn edging tool has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A lawn edging tool comprising a pair of handle bars having U-shaped lower end portions, a first transverse axle connected to the ends of said handle bars, respective ground-engaging support wheels on the ends of said axle, a second transverse axle connecting said U-shaped portions, and a toothed edging wheel journaled on said second transverse axle.

2. A lawn edging tool comprising a pair of handle bars having U-shaped lower end portions, a transverse bearing sleeve rigidly connecting the ends of said handle bars, a first axle journaled in said sleeve, respective ground-engaging support wheels on the ends of said axle, a second transverse axle connecting said U-shaped portions, and a toothed edging wheel journaled on said second transverse axle.

3. A lawn edging tool comprising a pair of handle bars having U-shaped lower end portions, a transverse bearing sleeve rigidly connecting the ends of said handle bars, a first axle journaled in said sleeve, respective ground-engaging support wheels on the ends of said axle, a second transverse axle connecting the bight portions of said U-shaped lower portions, a toothed edging wheel journaled on said second transverse axle, and brace means connecting said handle bars on opposite sides of said U-shaped portions, said toothed wheel having relatively large, generally triangular cutting teeth, the apices of said teeth being of the order of 90°.

No references cited.